United States Patent

[11] 3,586,838

| [72] | Inventors | Robert M. Henderson<br>Williams Bay;<br>Richard Zechlin, Beloit, both of, Wis. |
|---|---|---|
| [21] | Appl. No. | 570,909 |
| [22] | Filed | Aug. 8, 1966 |
| [45] | Patented | June 22, 1971 |
| [73] | Assignee | Fairbanks Morse Inc.<br>New York, N.Y. |

[54] ARITHMETIC CIRCUIT INCLUDING ELECTRONIC MULTIPLYING AND DIVIDING CIRCUITRY
9 Claims, 6 Drawing Figs.

[52] U.S. Cl. .......................................... 235/150.5,
 235/150.52, 307/228
[51] Int. Cl. ........................................ G06j 1/00,
 G06g 7/16
[50] Field of Search.......................................... 235/150.5,
150.51, 150.52, 150.53, 92, 194; 307/220, 228;
328/3.8, 66—68

[56] References Cited
UNITED STATES PATENTS

| 2,926,848 | 3/1960 | Gordon | 235/150.52 |
| 3,041,470 | 6/1962 | Woodworth | 307/228 |
| 3,063,635 | 11/1962 | Gordon | 235/150.51 |
| 3,080,555 | 3/1963 | Vadus et al. | 235/150.53 |
| 3,103,578 | 9/1963 | Dietrich | 235/150.52 |
| 3,264,457 | 8/1966 | Seegmiller et al. | 235/150.53 |
| 3,297,884 | 1/1967 | Baldwin et al. | 307/228 |

Primary Examiner—Malcolm A. Morrison
Assistant Examiner—Edward J. Wise
Attorney—Petherbridge, O'Neill & Lindgren ABSTRACT: Electronic circuitry is disclosed for combining signals representative of input factors to provide arithmetic combinations thereof.

PATENTED JUN 22 1971 3,586,838

INVENTORS
ROBERT M. HENDERSON
& RICHARD ZECHLIN
BY Petherbridge, O'Neill & Aubel
ATTORNEYS 3,586,838

1

ARITHMETIC CIRCUIT INCLUDING ELECTRONIC MULTIPLYING AND DIVIDING CIRCUITRY

The present invention relates to an electronic circuitry for arithmetically combining factors, and more particularly to such a circuit for performing the multiplication and division of selected factors.

A principal object of the invention is to provide an electronic circuit to perform an arithmetic operation and obtain a product or quotient of selected factors or variables rapidly and with accuracy.

Another object of the invention is to provide a circuit for obtaining a product or quotient which circuit utilizes relatively few components and is economical in construction.

In accordance with the invention, a product or quotient of selected factors is obtained by a circuit which includes elements representing electrical values which may be coupled into the circuit as respective input factors. The circuit of the invention includes time determining means, and output means arranged to be energized when signals representative of the input factors attain a predetermined value to thus provide an output representative of the product of the input factors.

The foregoing and other objects, features, and advantages of the invention will be apparent from the following more particular description of preferred embodiments of the invention, as illustrated in the accompanying drawings.

In the drawings wherein like reference characters refer to like elements throughout:

Figure 1:
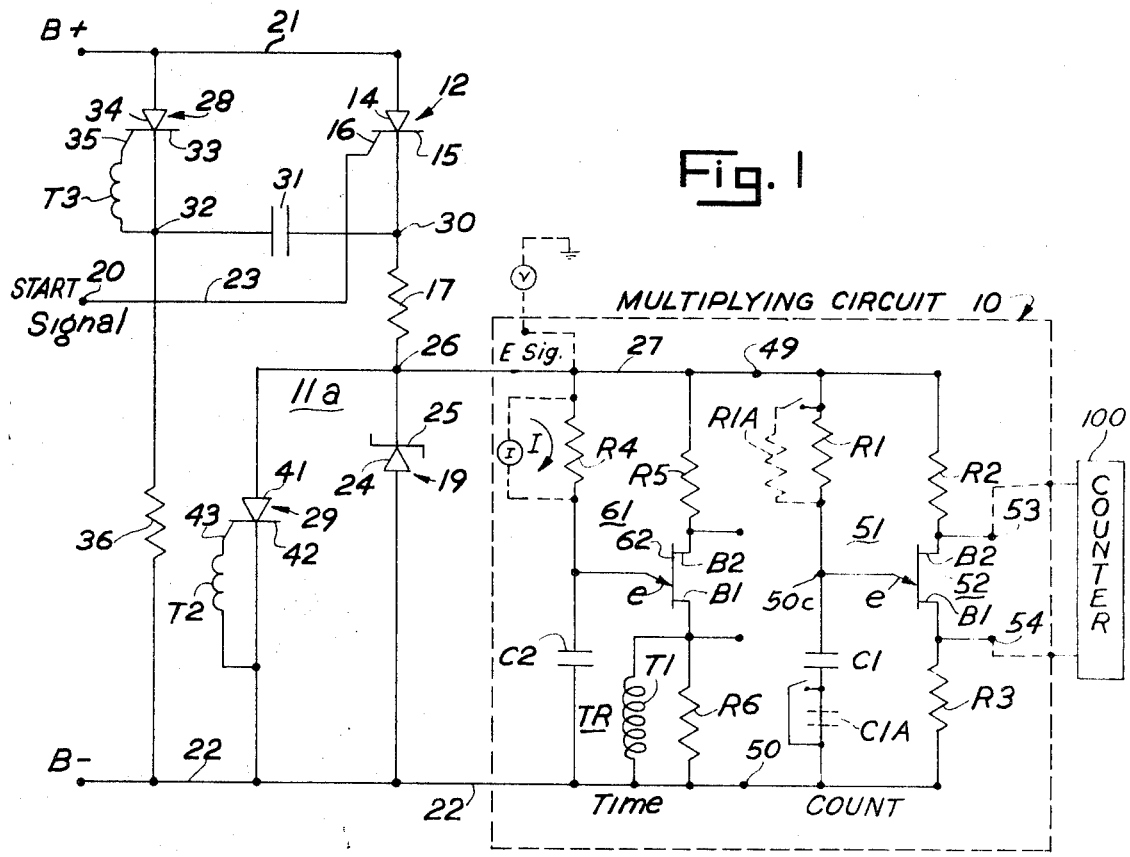
FIG. 1 is a schematic diagram of a multiplying and dividing circuit according to the invention.

A circuit for performing an arithmetic operation according to the invention is shown in FIG. 1. For convenience, in the following description, the circuit has been termed as "multiplying circuit 10," although it should be fully understood that the circuit can also function to divide, add, and subtract without departing from the spirit or scope of the invention, as will be explained more fully hereinbelow.

In FIG. 1, the circuit portion numbered 11a provides pulses of selected amplitude and duration to the multiplying circuit 10, as will be described hereinafter.

The overall circuit of FIG. 1 is connected across a direct current source of any suitable known type indicated by the terminal B+ connected to a conductive lead 21, and the terminal labeled B— connected to a conductive lead 22. An initiating or starting signal may be provided to the terminal 20 labeled "signal" which connects through a conductive lead 23 to the control electrode 16 of a silicon controlled rectifier 12. The silicon controlled rectifier 12 also includes an anode 14 which is connected to lead 21 and a cathode 15 which is connected to one terminal 30 of a resistor 17. For purposes of this description, each silicon controlled rectifier in the circuit will hereinafter be abbreviated or designated as an "SCR" as is well known in the art.

An SCR 12, which functions as a triggering or switching device for the circuit of FIG. 1, is connected in series with a resistor 17 and a Zener diode 19 across the leads 27 and 22. The number 26 is applied to the terminal or junction of resistor 17 and Zener diode 19. The Zener diode 19 has its anode 24 connected to the negative lead 22 and its cathode 25 connected to resistor 17 and, as is known, functions as a voltage limiting device. A signal of proper amplitude applied to terminal 20 causes the SCR 12 to conduct and hence a positive voltage is applied to terminal 26. Terminal 26 also con-

2 nects to lead 27 of the multiplying circuit 10. As is well known, Zener diode 19 prevents the voltage on terminal 26 from increasing in amplitude. Thus, as is well known, the Zener diode 19 prevents the voltage at terminal 26, and hence on lead 27, from going above a predetermined amplitude.

The pulse forming portion 11a of the circuit of FIG. 1 includes two other SCRs 28 and 29, as will now be described. The junction of the resistor 17 and SCR 12, which is labeled 30 in FIG. 1, is connected through a capacitor 31 and the cathode 33 of SCR 28. In FIG. 1, the junction of capacitor 31 and cathode 33 is labeled 32. Junction 32 is connected through a series resistor 36 to lead 22 and the B— terminal. The anode 34 of SCR 28 is connected to the lead 21 and the B+ terminal; and, the control electrode 35 of SCR 28 is connected to one terminal of the secondary winding T3 of a transformer TR. The other terminal of winding T3 is connected to junction 32, and hence to cathode 33 of SCR 28. For purposes of clarity in the drawing of FIG. 1, the windings T1, T2 and T3 of transformer TR are shown in spaced relation relatively separate from each other; however, it should be understood that in actual practice the various windings are inductively coupled to one another.

To understand the operation of the circuit, assume that SCR 28 is initially OFF or nonconducting and that a signal at terminal 20 has just turned SCR 12 ON. When the SCR 12 is turned ON, the voltage at terminal 30 rises to approximately the B+ voltage level; accordingly, the capacitor 31 charges to essentially the B+ potential with the right-hand (as oriented in FIG. 1) plate of capacitor 31 being positive relative to its left-hand plate. The voltage applied to terminal 26 and lead 27 is the B+ voltage minus the drop across SCR 12 and resistor 17. As mentioned above, the Zener diode 19 limits the voltage at terminal 26 and lead 27 to a preset amplitude.

The voltage applied to terminal 26 and lead 27 is determined as follows. When a pulse is applied to the primary winding T1 of transformer TR, as will hereinafter be explained, the secondary winding T3 will be energized such as to cause the SCR 28 to turn ON. When SCR 28 turns ON, the potential at terminal 32 connected to the cathode 33 of SCR 28 and to the left-hand plate of capacitor 31 (as oriented in FIG. 1) will rise to approximately the B+ voltage. Since the capacitor 31 already has a charge thereacross approximately equal to the B+ voltage and since the capacitor 31 cannot discharge instantaneously, the voltage at the right-hand plate of capacitor 31, and at terminal 30 will tend to rise to approximately twice the B+ voltage. The SCR 12 will then have a higher voltage on its cathode 15 than on its anode 14 thereby causing a momentary reverse current to flow in the SCR 12. This momentary reverse current causes the SCR 12 to turn OFF sharply.

SCR 28 will now be ON or conducting and SCR 12 will now be OFF. SCR 28 will remain ON, and capacitor 31 will now charge to B+ on its left-hand plate, until the SCR 12 is again turned ON. When SCR 12 is again turned ON, the voltage at terminal 30 rises to essentially B+ potential and this voltage plus the voltage on capacitor 31 will cause SCR 28 to be backbiased and to turn OFF.

SCR 29 in the pulsing circuit 11a has its anode 41 connected to terminal 26 and its cathode 42 connected to lead 22. The control electrode 43 of SCR 29 is connected to one terminal of the secondary winding T2 of transformer TR; the other terminal of winding T2 is connected to cathode 42. The operation of SCR 29 is as follows. SCR 29 is normally OFF. The secondary winding T2 of transformer TR is arranged such that when a pulse of current is applied to the primary winding T1 of transformer TR, the secondary winding T2 is energized to cause SCR 29 to turn ON. When SCR 29 turns ON the voltage at terminal 26 and lead 27 is reduced to essentially the B— potential of lead 22. SCR 29 thus functions to sharply terminate or short out the positive voltage applied to terminal 26 and lead 27. SCR 29 is desirable in the circuit of FIG. 1 since it has been found that square waves of voltage should be applied to terminal 26. Voltage waveforms applied to terminal 26 which are not sharply terminated and which have a trailing edge can cause the multiplier circuit portion labeled 10 to function improperly. SCR 29 is turned OFF when its anode current is cut off due to SCR 12 turning OFF. While in the embodiment shown herein an SCR is employed, other well-known methods or circuitry to avoid a trailing edge and provide a square pulse can be employed. Thus, the function of the circuit 11a is to provide square waveforms of voltage of fixed amplitude and fixed duration of time to the multiplying circuit 10.

Refer now specifically to the count circuit portion 51 of the multiplying circuit 10 of FIG. 1. In count circuit 51, a resistor R1 is connected in series with a capacitor C1 across the leads 22 and 27. A pair of resistors R2 and R3 are connected in a series circuit with the base B2 to the base B1 circuit of a unijunction transistor 52; and, the foregoing series circuit is connected in parallel with resistor R1 and capacitor C1. The emitter $e$ of the unijunction transistor 52 is connected to the junction 50c of the resistor R1 and the capacitor C1. The unijunction transistor 52 is of any suitable known design and, as will be explained hereinbelow, functions as a level detection device in a known manner.

As will become evident hereinafter, a signal output from the circuit of FIG. 1 may be obtained from either base B2 or base B1 of the unijunction transistor 52 and the respective terminals 53 and 54 coupled to a counter 100 of any suitable known type such as, for example, disclosed in the Handbook of Electronic Control Circuits by John Markus, McGraw-Hill Book Co., Inc., 1959.

A theory of operation of the count circuit 51 will now be explained with reference to the waveforms of FIG. 2. Assume that at a time $f=0$, a direct current voltage pulse ($Vin$, FIG. 2) is applied to the count circuit 51 by any suitable known means; that is, a voltage pulse $Vin$ is present across terminal points labeled 49—50 of FIG. 1. Assume capacitor C1 is initially at 0 (zero) potential and that the unijunction transistor 52 is in a nonconducting state; accordingly, capacitor C1 will charge through the resistor R1 to have a positive potential at its upper plate (as oriented in FIG. 1). The emitter $e$ of unijunction transistor 52 is connected to capacitor C1 and hence the voltage $Vc$ on capacitor C1 is the same as the voltage $Ve$ on the emitter $e$ of unijunction transistor 52. The voltage (waveform $Vc=Ve$, FIG. 2) across the capacitor C1 will rise in an exponential manner until the voltage at the emitter $e$ of unijunction transistor 52 reaches its conduction or avalanche point. The conduction point of unijunction transistor 52 can be given as $Ve=V_{B2} n$ (with respect to $V_{B1}$); where $Ve$ is the voltage on emitter $e$, $V_{B2}$ is the voltage on the base B2, and $n$ is the so-called intrinsic standoff ratio of the unijunction transistor 52.

When the voltage at the emitter $e$ of unijunction transistor 52 increases to a level at which the relationship indicated by the foregoing equation is obtained, the transistor 52 will avalanche and voltage pulses $V_{B2}$ and $V_{B1}$ which are of negative and positive polarity, respectively, will be produced at the bases B2 and B1 of unijunction transistor 52. When transistor 52 conducts, the capacitor C1 will discharge through a path traced from the upper plate of capacitor C1, the emitter $e$, to base B1 of unijunction transistor 52, resistor R3 to lead 22 and the lower plate of capacitor C1. After the capacitor C1 is discharged, the unijunction transistor 52 will recover; that is, it will present a high input impedance to the circuit of R1-C1.

The unijunction transistor 52 has a given conduction point and the resistors R2 and R3 each have fixed resistance values. Thus, if a fixed voltage is applied across the series circuit of resistor R1 and capacitor C1, the time required for the capacitor C1 to charge to the conduction or avalanche point of transistor 52 is a function of the resistor R1 and the capacitor C1.

It has been found convenient to provide components such as resistor R1 wherein resistors of weighted values can be connected in the circuit to provide a selected value. For example, a group of nine resistors of similar value can be connected in parallel to resistor R1 having no positional value but having weighted value, dependent only on the value of the resistor R1. Thus, there is a direct relation between the values of the various resistors and the factors which they represent. Accordingly, combinations of these resistors can be conveniently made to provide digital, BCD, binary, or any coding or base desired.

Referring to the circuit of FIG. 1, assume that the time required for the capacitor C1 to cycle once, that is, to charge and discharge once, is taken to be a unit value of time. Assume also that for this unit value of time the values of resistor R1 and of capacitor C1 are unit values of resistance and capacitance; that is, $R1=1$ and $C1=1$. Assume further that the voltage applied to the circuit portion 51 of FIG. 1 is a square wave or waveform of voltage, labeled 56 in FIG. 2, and is applied for precisely the aforesaid unit value of time. Accordingly, for the said unit value of time and for the resistance values $R1=1$, $C1=1$, capacitor C1 will cycle once; that is, capacitor C1 will charge and discharge once, see the waveform labeled 57 in FIG. 2. At the peak point 57a of the charging portion of the cycle 57, the transistor 52 will avalanche or conduct thus producing one pulse from base B2 and/or B1, see the waveforms labeled 58 and 59 in FIG. 2. As mentioned, when transistor 52 conducts it enables capacitor C1 to discharge. Thus, the following equation is suggested:

$R1 \times C1 = 1 \times 1 = 1$ pulse from $B2$ and/or $B1$.

Assume that the same square wave of voltage 56 is applied for the same single unit value of time. Also assume that the resistor R1 and capacitor C1 are changed to have different values, and that in a first condition the capacitor C1 is maintained at a single unit value and the resistance of R1 is changed. If the resistance of the circuit is changed by, for example, connecting another resistor R1A of the same value as resistor R1 in parallel with resistor R1, the total resistance value $R1+R1A = Rt$ is reduced by one-half. Accordingly, since the total resistance $Rt$ is reduced by one-half, the time required for the capacitor C1 to charge to the avalanche point of the unijunction transistor 52 is one-half of the aforesaid unit time value of waveform 56. Thus, for the given unit value of time 56, the capacitor C1 will cycle twice, see the waveforms labeled 63 and 64 in FIG. 2, that is, the capacitor C1 will charge and discharge twice and the following equation is suggested:

$Rt \times C1 = 2 \times 1 =$ two pulses from B1 and/or B2.

Assume next that the resistor R1 is maintained at its unit value and that the capacitance of the circuit is changed as by adding a capacitor C1A of the same value as capacitor C1 in series with the capacitor C1. The total capacitance value $C1+C1A = Ct$ is reduced by one-half. Accordingly, since the total capacitance $Ct$ is reduced by one-half, the time required for the capacitors C1 and C1A to charge to the avalanche point of the unijunction transistor 52 is one-half of the aforesaid unit value of time. Thus, for the given unit value of time, the capacitors $C1+C1A$ will cycle twice; that is, the capacitors $C1+C1A$ will charge and discharge twice. The following equation is accordingly suggested:

$R1 \times C1 = 2 \times 1 =$ two pulses from B1 and/or B2.

If, for example, both the total resistance $Rt$ and the total capacitance $Ct$ are varied, a table of effective values of resistance and capacitance can be established as follows (Let the initial resistor $R1=200$ k. ohms and the initial capacitor $C1=$ microfarad.):

| | Resistance—Rt, K | Capacitance—Ct, mf. |
|---|---|---|
| Effective value: | | |
| 1 | 200 | .1 |
| 2 | 200/2=100 | ½=.050 |
| 3 | 200/3=66.66 | ⅓=.033 |
| 4 | 50 | .025 |
| 5 | 40 | .020 |
| | etc. | |

Obviously, the foregoing relation can be continued for higher effective value of resistance and capacitance.

Figure 2:
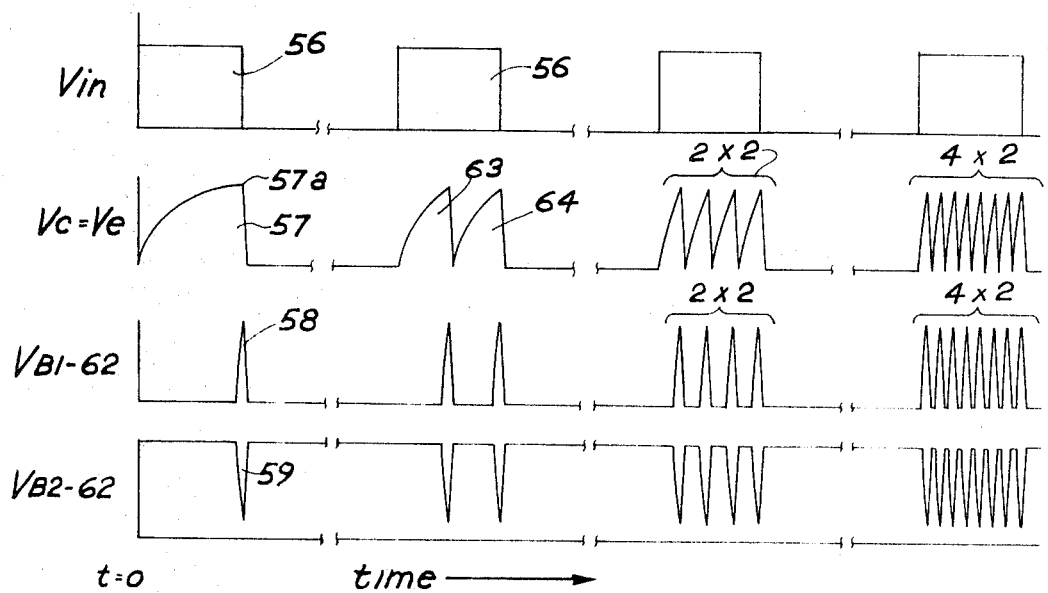
FIG. 2 shows waveforms useful in explaining the operation of the circuits of FIG. 1.

It can, therefore, readily be seen that the effective values of the total resistance $Rt$ and the total capacitance $Ct$ become the multiplying factors. For example, if two resistors equal in value to R1 connected in parallel with each other, as indicated in FIG. 5, are connected in the count circuit portion 51 in lieu of the single resistor R1, and if two capacitors equal in value to C1 are connected in the count circuit portion 51 in lieu of the single capacitor C1 in series, then:

$Rt$=200 k. = 100 k. ohms = 2
$Ct$=0.1 mf.=0.050 $\mu f$=2.

therefore, $Rt \times Ct$=2×2=4 pulses from B1 and/or B2, see the waveforms indicated as 2×2 in FIG. 2. Thus, in a unit length of time, such a circuit will charge and discharge 4 times thereby providing 4 pulses or counts on base B2 and B1. A digital count output is thus produced which is a product representative of the selected input factors; the count is coupled to suitable counters.

Figure 5:
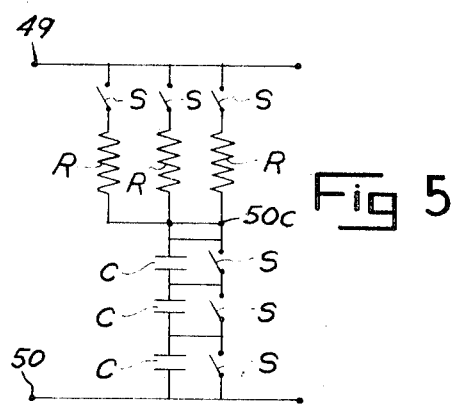
FIG. 5 is a schematic diagram of a switching circuit in accordance with the invention.

In FIG. 5 the switches S which connect the resistors R and capacitors C in the circuit are indicated as being mechanical switches; however, as is well known in the art, the switches S may be electronic switches of any suitable known type.

Figure 4:
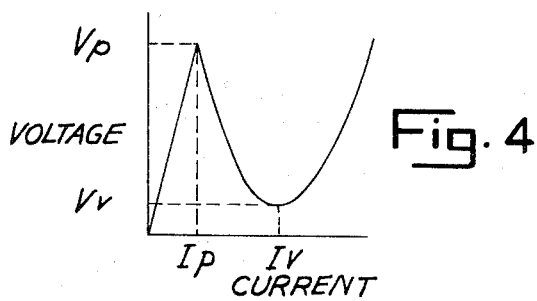
FIG. 4 is a waveform useful in explaining the operation of a unijunction transistor.

The general equation to describe the charging characteristics of the circuit comprising R1, C1 and a unijunction transistor may be written as follows (The typical unijunction transistor characteristic waveform is shown in FIG. 4.):

$$(Vp-Vv) = (E-Vv)\left(1 - e^{\frac{-\Delta t}{R1C1}}\right)$$

$$\frac{(Vp-Vv)}{(E-Vv)} = 1 - e^{\frac{-\Delta t}{R1C1}}$$

$$e^{\frac{-\Delta t}{R1C1}} = \frac{(E-Vv)-(Vp-Vv)}{E-Vv}$$

$$e^{\frac{-\Delta t}{R1C1}} = \frac{E-Vp}{E-Vv}$$

$$\Delta t = R1C1 \ln\frac{E-Vv}{E-Vp}$$

$$\ln\frac{E-Vv}{E-Vp} = K_3$$

$$\Delta t = K_3 R1C1$$

$Vp$ = Peak voltage at the emitter of the unijunction transistor
$Vv$ = Valley voltage emitter
$E$ = Applied voltage
$\Delta t$ = Time change
$R1$ = Charging resistor
$C1$ = Charging capacitor
$e$ = 2.718

Values of R1 and C1 are chosen as noted before, $K_3$ is a circuit constant fixed by the applied voltage E; peak unijunction voltage $Vp$, and valley unijunction voltage $Vv$ are preselected.

Assume the values chosen for R1 and C1 in the foregoing equation $\Delta t = K_3 R1C1$ above are assigned unit effective values. Then the $\Delta t$ determination by unit effective of R1C1 values can be considered as the unit value of time. This unit value of time is controlled by a fixed time clock, and this is the time that a square wave of voltage is applied to the multiplier circuit 11a.

Now, if the value of R1 is reduced to one-half of its original resistance value:

$\Delta t1 = K_3(R1/2)C1$
$\Delta t1 = (1/2)t$

The process can be continued for both R1 and C1 just as before. Assigning letters rather than numbers to the variables let R1 be reduced to $R/n$ and C1 be reduced to $C1/m$, then $t_{nm}$ will be $\Delta t/n \cdot m$ and the number of pulses = $1/t_{nm}$ will be $n \cdot m$ and, therefore, multiplication occurs as shown.

It can be further seen by the above argument that if the value of resistance is twice that of the unit value of resistance $\Delta t_2 = K_3 2R1)C1$
$\Delta t_2 = 2t1$ Thus, twice the charge time will be required and half the number of pulses. While a single pulse cannot be divided, the unit value can be established as a large number of counts and thus can be divided. For example, the unit value can be set at 1000; hence, a division operation such as 1000/2=500 is possible. More generally, the previous two equations can be expressed as follows:

$t_{nm} = K_3(nR1)(mC)$
$t_{nm} = n \cdot m \cdot t$ and the number of pulses
pulses = $1/t_{nm} = 1/n \cdot m$ and thus a general division operation can be obtained.

In one embodiment of the multiplying circuit 10 shown in FIG. 1, capacitors were connected in series to effect the proper multiplying factor. In other embodiments of the circuit of FIG. 1, such as, for example, solid state circuits, it was found more convenient to connect the capacitors in parallel. Accordingly, such an embodiment of the invention wherein the capacitors may be conveniently connected in parallel will now be described.

Refer to FIG. 1 and consider the circuit labeled 61 of the multiplying circuit 10 which is a timing circuit for providing the circuit clock time and which will be referred to as the time circuit. The time circuit 61 is almost identical to and operates on the same principle as the circuit 51. By using the time circuit 61 to provide a predetermined variable time clock instead of a fixed time clock, multiplication may be accomplished in a somewhat different manner than that previously described, as will now be explained.

Assume a clock unit value of time $\Delta t$ is set by the parameters of the time circuit 61 such that the unit value of time $\Delta t = K \times R4 \times C2$; where $K$ is a constant and R4 and C2 represent the resistance and capacitance values adjusted to obtain the unit value of time $\Delta t$. The values of the resistor R4 and the capacitor C2 may be considered as unit values of R4 and C2.

Assume the resistor R4 and the capacitor C1 each have a fixed value while the resistor R1 and capacitor C2 are to be variable, and thus are representative of multiplying factors. Consider that the conditions mentioned previously exist; that is, that effective values of $R1=1$ and $C2=1$ produce a pulse of a unit length of time.

Figure 3:
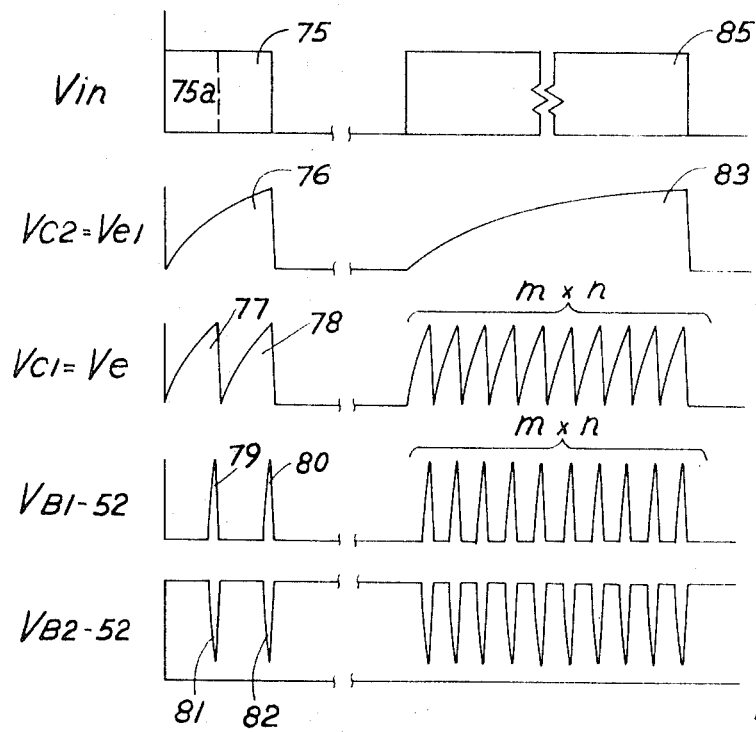
FIG. 3 shows additional waveforms useful in explaining the operation of the circuit of FIG. 1.

If, now, capacitor C2 is increased to twice its unit value, it will be seen that the clock time labeled 75a in graph Vin of FIG. 3 is increased to twice its unit value, as indicated by the entire waveform 75. In this case, the capacitor C2 will take twice as long to charge and discharge as indicated by the waveform 76 in graph $Vc2=Ve1$ of FIG. 3. Since the clock time is doubled, the capacitor C1 will cycle twice during this period of time, as indicated by waveforms 77 and 78 in graph $Vc1=Ve$ of FIG. 3. Consequently, the number of pulses $VB1$ and VB2 obtained from unijunction transistor 52 will also double as indicated by pulses 79—82 in FIG. 3. Thus, two pulses will occur when $R1=1$ and $C2=2$, in accordance with the following equation:

$R1 \times C2 = 1 \times 2 = 2$ pulses.

To obtain the effective multiplication of other input factors, the same logic previously described may be followed.

Assume now the capacitor C2 is allowed to equal $n$ times the unit value of capacitance indicated by the waveform labeled 83 in FIG. 3. Thus, the time indicated by waveform 83 is the time required for C2 to charge to cause unijunction transistor 52 to conduct and discharge capacitor C2. Note, that when unijunction transistor 62 conducts it causes a pulse of current to flow in the primary winding T1 of transformer TR which, as explained above, causes secondary winding T3 to turn SCR 28 ON which, in turn, causes SCR 12 to turn OFF to thereby switch OFF the voltage applied to the terminal 26, lead 27, and the multiplying circuit 10. Also, as mentioned above, the pulse of current in primary winding T1 of transformer TR causes secondary winding T2 to turn ON SCR 29 to sharply terminate or short out the voltage at terminal 26 and lead 27.

The voltage effective across points 49 and 50 of leads 27 and 22 is indicated by the square wave or waveform of voltage labeled 85 in FIG. 3. Since the length or duration of the square wave 85 is a function of C2, the voltage applied to count circuit 51 and the unijunction transistor 52 is equal to n times the unit value of time. If R1 is allowed to equal a unit value of resistance divided by m, the effective value of R1 is equal to m. Therefore, m pulses will occur in one unit length of time, and m×n pulse will occur in 12 unit lengths of time.

As mentioned above and as can be appreciated, the circuit of FIG. 1 can provide a means for effecting a division operation. The division operation may be performed either with the variable time type of operation or with the fixed time type of operation. As an example, and with respect to the variable time operation, it can readily be seen from the previously cited equation $\Delta t = K \times R4 C2$, that a division operation can be accomplished such as by changing the value of C2 to a portion of its unit value. More specifically, to reduce the value of C2 to one-half of its unit value, a capacitor equal in value to C2 may be connected in series with C2, as indicated generally in FIG. 5. In this latter condition, the unit time $\Delta t/2$ would equal to one-half of $\Delta t$. Thus, in the example given, the time that the voltage is applied to the unijunction transistor 52 is reduced one-half of its unit value and permits only one-half of the previous number of pulses or counts to be established.

Likewise, the time could be varied by reducing the total resistance by adding resistors in parallel, as indicated by the resistors generally labeled R in FIG. 5.

Figure 6:
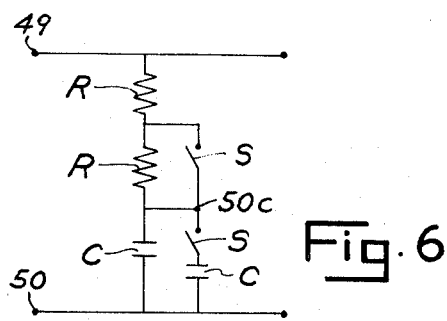
FIG. 6 is another schematic diagram of a switching circuit in accordance with the invention.

FIG. 6 shows that the circuit parameters may also be changed by adding resistances in series and capacitance in parallel. The switches labeled S in FIG. 6 may be electronic switches of any suitable known type which are arranged to be energized to selectively connect and disconnect the capacitors C and resistors R in the circuit, as is known in the art.

While a single pulse or count cannot be divided; the unit value can be established or equated to a large number of pulses and a division operation can then be performed. Thus, both R4 and capacitor C2 can be made division factors as well as factors for multiplication.

The circuit of FIG. 1 can also be utilized for processing an analog input signal and/or a fractional input signal. It should be appreciated that values of R1 and C1 need not be integral values of the assumed unit value of resistance and capacitance, and the values to which R4 and C2 are varied need not be an integral value of the unit value of the initial R4 and C2. Thus, signals representing analog or fractional factors as either resistance or capacitance can be factors in a multiplication or division operation.

The operation of the circuit of FIG. 1 need not be limited to resistance and capacitance variables. The same reasoning can be applied to the processing of a given current value as was applied to the resistance and capacitance values previously described. Further, a combination of factors such as, for example, one represented by current and another represented by resistance can be processed. Assume a supply source couples a first current I1 across resistor R4 as shown in FIG. 1, one selected current value establishes one unit length of time. A second selected current value can be chosen to provide two unit lengths of time; and, another current value can be chosen to provide three unit lengths of time. A multiplication and division operation can be performed as described above. A similar condition, responsive to a voltage variable, can be established by applying signal voltage E Sig. to the upper terminal of resistor R1. Further, signal voltages applied to the base B2 of the unijunction transistor 62 could also be processed to provide a multiplication and division operation. The current and voltage inputs may also be of the analog or fractional type, as well as being of digital values.

The circuit of FIG. 1 may also be used to perform addition and subtraction as will now be discussed.

Assume for purposes of explanation that the following addition is to be performed:
4+3=7.

The foregoing addition is performed in the following steps:

1×4=4 pulses. The pulses are entered in the counter, and the counter is not reset.

1×3=3 pulses. The pulses are entered in the counter and the three pulses are added to the four counts previously entered in the counter. The counter registers a total count of seven.

In this example, the time base provided by resistor R4 and capacitor C2 can be arranged to be the effective value of one (1) in each of the foregoing equations and the values of 4 and 3 can be selectively entered into the circuit by varying the resistance of R1 or the capacitance of C1 as previously explained.

Assume now that the subtraction of 4−3=1 is to be performed. Note that for the purpose of performing a subtraction, the counter of FIG. 1 should be of any suitable known type arranged to up-count and/or down-count. In this example, in order to perform a subtraction the counter is programmed to count up during the first entry of pulses and to count down during the second entry of pulses.

1×4=4 pulses. The pulses are entered in the counter and the counter counts up and is not reset.

1×3=3 pulses. The pulses are entered in the counter and the counter counts down.

Again, in this example, the time base provided by resistor R4 and capacitor C2 may be arranged to be an effective value of 1 in each of the foregoing equations and the values of R1 and C1 can be selectively entered into the circuit by varying the resistance of R1 and the capacitance of C1.

In cases where it may be desirable to operate on more than two factors concurrently in the circuit of FIG. 7, this can conveniently be done by selecting each of the components R4, R1, C2 and C1 as well as the current and voltage to represent a desired factor.

While the invention has been particularly shown and described with reference to preferred embodiments thereof, it will be understood by those skilled in the art that various changes in form and details may be made therein without departing from the spirit and scope of the invention.

We claim:

1. A circuit for receiving and arithmetically combining signals representative of input factors comprising
first means for providing a time base of a duration representative of a first input factor;
second means comprising resistance components and capacitance components connected in circuit relation selectively representing second input factors for providing an output signal during a selected time period representative of said input factors;
third means controlled by said first time base providing means for energizing said resistance and capacitance components for a duration determined by said first means; and
gating means connected to said capacitance components and arranged to be activated when said capacitance components attain a predetermined energization to provide output pulses representative of the arithmetic combination of said input factors.

2. A circuit for receiving and arithmetically combining input factors comprising
first means providing a time base of a duration representative of a first input factor;
second means for providing output signals during a selected time period representative of second input factors, said second means comprising resistance means and capacitance means connected in series relation;
means for energizing said resistance and capacitance means for a duration determined by said time base providing means;
gating means connected to said capacitance means and arranged to be activated when said capacitance means charges to a predetermined level, to thereby provide output pulses representative of the arithmetic combination of said input factors, said capacitance means charging to said predetermined level of said second input factors; and counting means for counting the number of times said gating means is activated whereby the product or quotient of said input factors may be selectively obtained.

3. A circuit as in claim 2 wherein said gating means comprises a semiconductor device.

4. A circuit as in claim 2 wherein,
a. said first and second means each comprises resistive elements connected in series with capacitance elements; and
b. said gating means comprising a unijunction transistor having an emitter and two base electrodes, said emitter being connected to the junction of said resistive elements and said capacitive elements.

5. A circuit for multiplying or dividing input factors comprising, in combination,
a. first and second operating circuits each including a plurality of resistive and capacitive elements selectively connected to one another;
b. first and second gating means connected to said first and second circuits respectively;
c. switching means energizable by signal representative of input factors for selectively connecting said resistive and capacitive elements in said circuit;
d. said first gating means being actuatable when a capacitive element in said first circuit charges to a selected level to thereby discharge said capacitive element through said first gating means and provide a time base for said circuit;
e. said second gating means being actuatable when a capacitive element in said second circuit charges to a selected level to thereby discharge said second capacitive element through said second gating means and provides a selected number of pulses during a time selected value of time; and
f. means connecting the output of said first gating means to control the operation of said second circuit and said second gating means in accordance with said time base whereby an output representative of the multiplication or division of said input factors is obtained.

6. A circuit as in claim 5 further including,
a. energizing means for developing pulses of square waveform configuration; and
b. means energizeable by said first gating means to terminate said square waveform pulses.

7. A method of arithmetically combining input factors including the steps of,
providing a time base of a given time duration representative of a first input factor;
generating a number of pulses during a selected time period representative of a second input factor by selectively combining resistance and capacitance means; controlling the generation of pulses represented by said resistance and capacitance means in accordance with said time base;
energizing said capacitance means through said resistance means to be charged thereby in accordance with said second input factors to be represented; and counting the number of pulses generated to obtain the arithmetic combination of said input factors.

8. A method of adding input factors including the steps of,
providing a time base equal to unity and representative of a first input factor;
generating pulses representative of a second factor during a selected time period controlled in accordance with said time base;
summing the pulses;
setting said time base equal to unity;
generating pulses controlled in accordance with said time base and representative of another factor; and
summing the pulses generated to obtain the result of the addition of said factors.

9. A method of adding input factors including the steps of,
a. providing a time base equal to unity and representative of a first factor;
b. generating pulses representative of a second factor during a selected time period controlled in accordance with said time base;
c. summing the pulses;
d. setting said time base equal to unity;
e. generating pulses controlled in accordance with said time base and representative of another factor; and
f. subtracting said pulses representative of said second factor from the count established in step (c).

UNITED STATES PATENT OFFICE
CERTIFICATE OF CORRECTION

Patent No. 3,586,838          Dated   June 22, 1971

Inventor(s)  Robert M. Henderson, et al

It is certified that error appears in the above-identified patent and that said Letters Patent are hereby corrected as shown below:

Column 3, line 32, the letter "f" should read -- t -- . Column 4, line 58, the equation "R1 X C1 = 2 X 1" should read -- R1 X Ct = 1 X 2 = -- ; line 62, the letter "k" should read -- K -- ; line 63, the equation "C1 = microfarad" should read -- C1 = .1 microfarad.): -- . Column 6, line 1, the "2R1)" should read -- (2R1) -- ; line 10, the "(mC)" should read -- (mC1) -- . Column 7, line 16, the "R4C2," should read -- R4 X C2 -- .

Signed and sealed this 10th day of October 1972.

(SEAL)
Attest:

EDWARD M. FLETCHER, JR.          ROBERT GOTTSCHALK
Attesting Officer                Commissioner of Patents